United States Patent
Luo et al.

(10) Patent No.: US 11,106,719 B2
(45) Date of Patent: Aug. 31, 2021

(54) HEURISTIC DIMENSION REDUCTION IN METADATA MODELING

(71) Applicant: International Business Machines Corporation, Armonk, NY (US)

(72) Inventors: Lin Luo, Ottawa (CA); Changying Sun, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 16/283,046

(22) Filed: Feb. 22, 2019

(65) Prior Publication Data

US 2020/0272651 A1    Aug. 27, 2020

(51) Int. Cl.
*G06F 16/00* (2019.01)
*G06F 16/38* (2019.01)
(Continued)

(52) U.S. Cl.
CPC ........... *G06F 16/38* (2019.01); *G06F 16/334* (2019.01); *G06F 16/338* (2019.01); *G06F 16/35* (2019.01)

(58) Field of Classification Search
CPC .......... G06F 16/30; G06F 16/36; G06F 16/90; G06F 16/951; G06F 16/217; G06F 16/2272; G06F 16/24522; G06F 16/24578; G06F 16/334; G06F 16/338; G06F 16/35; G06F 16/38; G06F 16/58; G06F 16/583; G06F 16/9024; G06F 16/245; G06F 16/24575; G06F 40/00; G06F 9/5072; G06F 16/9535; G06F 16/285; G06F 9/50; G06F 16/367; G06F 16/90335; G06F 2111/10; G06F 16/211; G06F 16/254; G06F 16/3334; G06F 21/6245; G06F 40/30
See application file for complete search history.

(56) References Cited

U.S. PATENT DOCUMENTS 7,149,983 B1 * 12/2006 Robertson ........... G06F 16/2428
                                                       715/810
9,336,253 B2    5/2016 Gorelik
(Continued)

OTHER PUBLICATIONS

P. Mell, et al. "*The NIST Definition of Cloud Computing*", NIST Special Publication 800-145, Sep. 2011, Gaithersburg, MD.
(Continued)

*Primary Examiner* — Shyue Jiunn Hwa
(74) *Attorney, Agent, or Firm* — Robert Shatto; George Blasiak; Heslin Rothenberg Farley & Mesiti PC

(57) ABSTRACT

Methods, computer program products, and systems are presented. The methods include, for instance: metadata on respective datasets from a plurality of data sources. An enhanced metadata is prepared with semantic information, available data statistics, and search index associated with items of the metadata. The metadata is also classified based on ontology rules. An intent phrase to search the datasets from the plurality of data sources is obtained from a user. The enhanced metadata is searched with a semantic search query formed from the intent phrase, and search result is classified into semantic element classes generated from the intent phrase. A metadata model that satisfies the intent phrase is produced by identifying join columns and respective join relationships from the search result.

20 Claims, 10 Drawing Sheets

(51) Int. Cl.
*G06F 16/338* (2019.01)
*G06F 16/35* (2019.01)
*G06F 16/33* (2019.01)

(56) References Cited

U.S. PATENT DOCUMENTS

| | | | |
|---|---|---|---|
| 9,378,285 B2 | 6/2016 | Marchisio | |
| 2005/0043940 A1* | 2/2005 | Elder | G06F 16/24522 704/9 |
| 2005/0278357 A1 | 6/2005 | Brown | |
| 2007/0016563 A1* | 1/2007 | Omoigui | G06F 16/90 |
| 2007/0282784 A1 | 5/2007 | Modani | |
| 2007/0179959 A1 | 8/2007 | Sharma | |
| 2009/0031236 A1* | 1/2009 | Robertson | G06F 16/3328 715/765 |
| 2013/0024430 A1 | 1/2013 | Gorelik | |
| 2015/0310104 A1* | 10/2015 | Marchisio | G06F 16/36 707/722 |
| 2016/0247090 A1 | 8/2016 | Yu | |
| 2016/0373456 A1* | 12/2016 | Vermeulen | G06F 16/245 |

OTHER PUBLICATIONS

P. Heim, et al. "*Interactive Relationship Discovery Via the Semantic Web*", 2010.

T. Dasu, et al. "*Mining Database Structure; Or, How to Build a Data Quality Browser*," ACM SIGM OD, ACM-1-58113-497, Jun. 4-6, 2002.

Y. Huhtala, et al. "*TANE: An Efficient Algorithm for Discovering Functional and Approximate Dependencies*," The Computer Journal, col. 42, No. 2, 1999.

A. Rosin, et al. "*A Machine Learning Approach to Foreign Key Discovery*," 12th International Workshop on the Web and Databases, WebDB, 2009.

Attivio, "*Accelerate Data Discovery*", http://info.attivio.com/rs/345-RHZ-769/images/Accelerate-Data-Discovery-Profile-Identify-Unify-Attivio-White-Paper.pdf, Accessed, Feb. 22, 2019.

P. Vrablecova, et al. "*Supporting Semantic Annotation of Educational Content by Automatic Extraction of Hierarchical Domain Relationships*," IEEE Transactions on Learning, vol. 9, Issue 3, dated Feb. 20, 2017.

* cited by examiner

HEURISTIC DIMENSION REDUCTION IN METADATA MODELING

TECHNICAL FIELD

The present disclosure relates to semantic data modeling technology, and more particularly to methods, computer program products, and systems for improving computational efficiency in dimension reduction of semantic data models by heuristics.

BACKGROUND

In conventional dimension reduction in data modeling, identifying which fields of data are related in a large set of data and defining relationships amongst the identified set of fields is a major step that requires significant amount of computation and technical planning, and that is often an interactive process to identify the fields of data and to discover relationships between the identified fields. In areas of application that requires data modeling based on large sets of data in order to provide useful information from the large sets of data in real time, efficiency and automation in identifying relevant fields and discovering the relationships between the fields more accurately would determine utility of the application.

SUMMARY

The shortcomings of the prior art are overcome, and additional advantages are provided, through the provision, in one aspect, of a method. The method includes, for instance: obtaining, by one or more processor, metadata on respective datasets from a plurality of data sources; preparing, by the one or more processor, an enhanced metadata based on the metadata from the obtaining, where an item of the metadata is associated with semantic information for the item, available data statistics on the item, and a search index for the item, and where the enhanced metadata has all items of the metadata semantically classified into respective potential join columns; receiving, by the one or more processor, an intent phrase for search on the datasets from the plurality of data sources; and producing, by the one or more processor, a metadata model that satisfies the intent phrase, the metadata model including a plurality of join columns and a plurality of join relationships, where a join column of the metadata model indicates a column common in two entries from the enhanced metadata, where a join relationship of the metadata model is inferred as a relationship between two entries of the enhanced metadata that commonly have the join column, and where the two entries are classified into respective semantic element classes extracted from the intent phrase.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Dimensionality in statistics refers to a number of attributes belong to a dataset. Often each attribute is represented with a column in a table describing the dataset. In areas data analysis and modeling utilizing statistics, machine learning, and information science, dimensionality reduction or dimension reduction is the process of reducing the number of variables under consideration by obtaining a set of principal variables.

In domains such as numerical analysis, sampling, combinatorics, machine learning, data mining and databases, the volume of the data space increases exponentially with increase of the dimensionality of the subject dataset, to the extent that any statistically meaningful and reliable sample data for the data space would be of a great size. Accordingly, significant effort is made to reduce dimensionality of dataset in the aforementioned areas of technology and application in order to obtain more reliable information from a reasonable amount of data with less computation and more efficiency.

In conventional dimension reduction in data modeling, users are often asked to provide a set of tables to look for to discover a join relation. Considering the size and complexity of dataset in certain domain of application, the manual/interactive process in dimension reduction for data modeling would significantly compromise efficiency and error-prone, and often unable to provide any credible result in real time. In order to automate the dimension reduction for data modeling, however, the amount of computation and technical planning required is significant. Particularly with a large set of data subject to analysis for a certain domain of application where data is constantly generated and dynamically updated, the cost of repeated planning and extensive computation for ever changing body of data would be prohibitive to practically implement any data modeling with dimension reduction.

Particularly, in most information science, although most experts in a certain subject application area have extensive knowledge on the subject, it is unlikely that the same experts also have the expertise and technology in information science to utilize their knowledge on the subject in data modeling. For example, in business intelligence and analytics, users who are often business analysts spend a great deal of time analyzing the information from data sources. However, manually working on a large amount of data to generate statistically reliable result in extracting patterns and trends, probing accuracy of the patterns and trends, and spotting relationships amongst factors and generating solutions are extremely labor intensive and time consuming. When the source data are disjoint and relationships between bodies of source data are unclear due to a lack of support for referential integrity constraints, producing any result from a large dataset is even more difficult.

Figure 1:
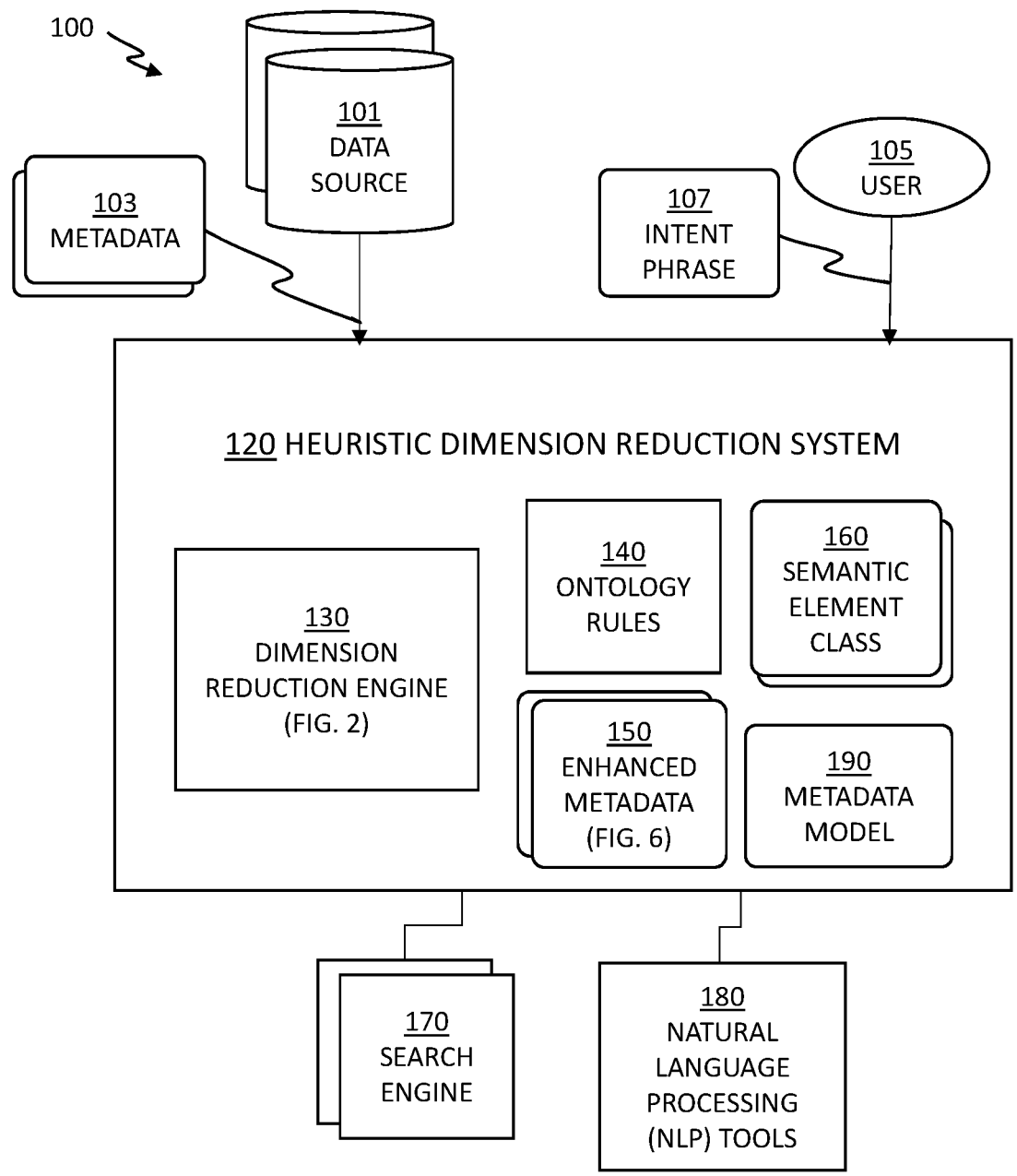
FIG. 1 depicts a system for automatically discovering relationships between fields of relational databases, in accordance with one or more embodiments set forth herein.

FIG. 1 depicts a system 100 for automatically discovering relationships between fields of relational databases, in accordance with one or more embodiments set forth herein.

The system 100 includes a heuristic dimension reduction system 120. The heuristic dimension reduction system 120 imports metadata 103 from one or more data source 101, respective to each data source 101. The system 100 uses combination of techniques to improve performance in inferring join relationships in content of the data source 101 on demand. The system 100 further includes heuristic rules with respect to referential cardinality in data from the data source 101, and a distinctive set of heuristic rules with respect to semantics on join column identification.

The heuristic dimension reduction system 120 includes a dimension reduction engine 130 and ontology rules 140. The heuristic dimension reduction system 120 is coupled to a search engine 170 and natural language processing (NLP) tools 180, including semantic analysis and classification functionalities. The dimension reduction engine 130 operates in two phases. Details on operations of the dimension reduction engine 130 are presented in FIGS. 2, 3, 4, and 5 and respectively corresponding descriptions.

In Phase One of operations, the dimension reduction engine 130 generates enhanced metadata 150 by processing the metadata 103 by use of the ontology rules 140, the search engine 170 and the NLP tools 180. The Phase One, or the analysis phase, of the dimension reduction engine 130 handles often time-consuming metadata preparation prior to receive any request on the data sources 101. Details on certain exemplary components of the enhanced metadata 150 are presented in FIG. 6 and corresponding description.

The ontology rules 140 of the heuristic dimension reduction system 120 specifies rule of the metadata 103 with regard to the representations of data in the respective data source 101, including formation, naming, definitions, categories, properties of various fields in the data from the data source 101, as well as relationships between fields, characteristics of entities represented by respective fields. The ontology rules 140 can be generic or domain-specific, and multiple layers of ontology rules can be hierarchically applied to the same field in data/metadata. The ontology rule 140 applicable for certain fields of the metadata 103 demonstrates what the field represents and how the field is related to other fields in order to represent information with the related fields. In certain embodiments of the present invention, the ontology rules 140 are established and provided as a component of the heuristic dimension reduction system 120 for generic relational database, and/or vocabularies in the area of business intelligence (BI).

The dimension reduction engine 130, in Phase Two of operations, receives a request from a user 105, referred to as an intent phrase 107 requesting a particular information from the data sources 101, and processes on-demand relationship inference in real time.

In the Phase Two, the dimension reduction engine 130 first classifies the enhanced metadata 150 into a plurality of semantic element class 160 according to the intent phrase 107, by use of the search engine 170 and the NLP tools 180. The dimension reduction engine 130 produces a metadata model 190 that includes join columns searched by the intent phrase 107 against the enhanced metadata 150 and relationship between the join columns. The metadata model 190 is utilized in later searches and requests of the data sources 101 in generating the results more accurately and efficiently for requests semantically similar to the intent phrase 107.

Embodiments of the present invention can be a component of business intelligence system in order to assist business users with data modeling, and to improve performance with search and forming solution from source data. Particularly in the area of business data analysis, the amount of source data increases rapidly, and manually exploring possibilities for a join relationship between two tables selected from a very large number of tables is impractical and computationally wasteful, and impossible to produce any result in real time. The dimension reduction engine 130 automatically identifies join columns and creates the inferred relationship that is semantically compatible with the intent phrase 107, which will efficiently create a search result that satisfies the intent phrase 107 in real time.

Figure 2:
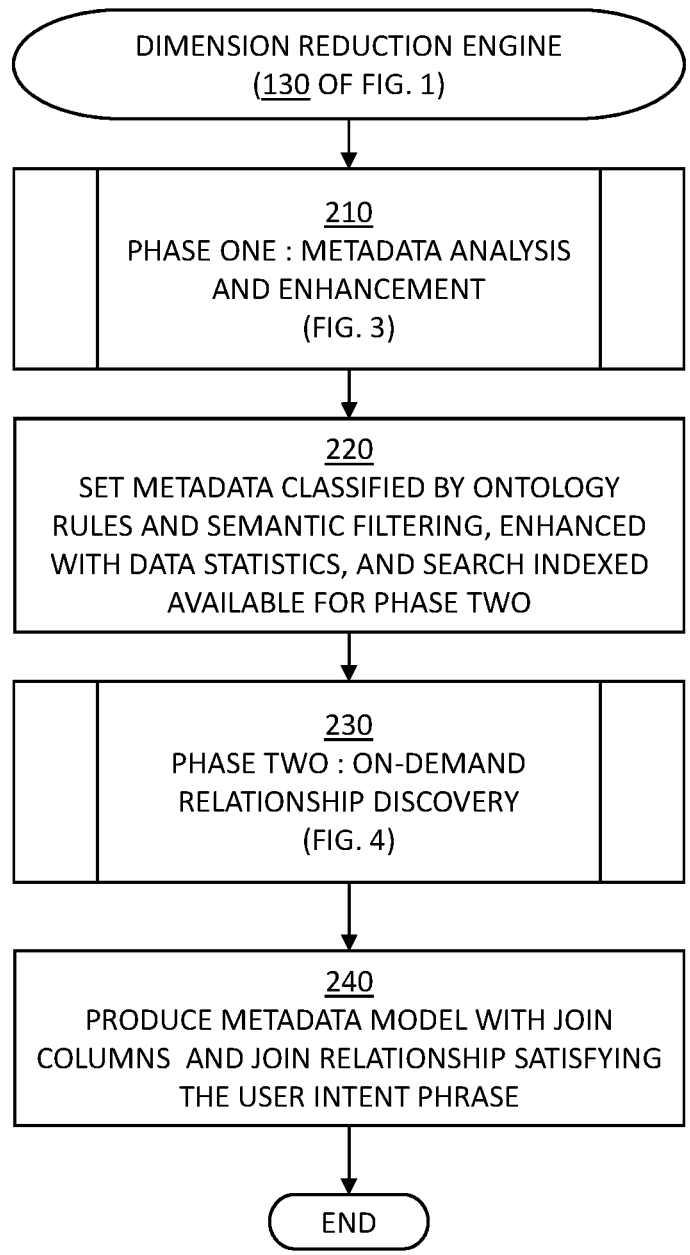
FIG. 2 depicts a flowchart for the dimension reduction engine, in accordance with one or more embodiments set forth herein.

FIG. 2 depicts a flowchart for the dimension reduction engine 130, in accordance with one or more embodiments set forth herein.

The dimension reduction engine 130 performs dimension reduction on the metadata 103 of the data sources 101 in two phases. The dimension reduction engine 130 reduces computational complexity in automatically discovering join relationships amongst entries of the metadata 103 by use of heuristics. Blocks 210 and 230 respectively represent Phase One and Phase Two. Block 220 specifies the result of Phase One operations, and block 240 specifies the result of Phase Two operations.

In certain embodiments of the present invention, the dimension reduction engine 130 is a component of a business analysis (BA) system, or a business intelligence (BI) engine.

In block 210, the dimension reduction engine 130 analyzes and enhances the metadata 103 describing respective data source 101 in Phase One operations. The dimension reduction engine 130 first imports the metadata 103 from various data sources 103. The dimension reduction engine 130 extracts semantic information from the metadata 103 by running natural language processing (NLP) tools 180, and adds the extracted semantic information to the metadata 130. The dimension reduction engine 130 classifies the metadata 103, as being enhanced with the semantic information, according to the ontology rules 140 and semantic filtering. The dimension reduction engine 130 further enhances the metadata 103 with data statistics on the metadata 103, and indexes the metadata 103 for searches. At the conclusion of the Phase One, the dimension reduction engine 130 produces the enhanced metadata 150. Detailed operations in the Phase One are presented in FIG. 3 and corresponding description. Then the dimension reduction engine 130 proceed with block 220.

In certain embodiments of the present invention, the dimension reduction engine 130 performs the Phase One operations periodically, upon detecting a new data source, or upon detecting update with the metadata 103 for any of the data source 101. The dimension reduction engine 130 pre-processes the metadata 103 in the Phase One and responds to the intent phrase 107 in the Phase Two based on the enhanced metadata 150 that is static during the Phase Two operations. In other embodiments of the present invention, the Phase One operations can be repeated and the enhanced metadata 150 can be regenerated, upon the dimension reduction engine 130 receives the intent phrase 107 from the user 105.

In block 220, the dimension reduction engine 130 sets the enhanced metadata 150 as processed from the Phase One in block 210 available for the Phase Two operations of the dimension reduction engine 130. Then the dimension reduction engine 130 proceed with block 220.

In block 230, the dimension reduction engine 130, in Phase Two operations, discovers relationship in entries of the enhanced metadata 150 by heuristics and semantic classification according to the intent phrase 107 provided by the user 105 for a search against the enhanced metadata 150, and produces the metadata model 190 that satisfies the intent phrase 107. Detailed operations in the Phase Two with respect to the intent phrase 107 process and a search against the enhanced metadata 150 are presented in FIG. 4 and corresponding description. Detailed operations in the Phase Two with respect to inferring relationship based on the search result from the enhanced metadata 170 are presented in FIG. 5 and corresponding description. Then the dimension reduction engine 130 proceed with block 220. Then the dimension reduction engine 130 proceed with block 240.

In block 240, the dimension reduction engine 130 produces the metadata model 190 that includes discovered join columns and inferred relationships between two entries that share a join column, based on the Phase Two operations of block 230. The join columns in respective entries of the metadata model 190 are identified by semantic searches based on the intent phrase 107 against the enhanced metadata 150, as from block 220, resulting from the Phase One operations in block 210. In the Phrase Two operation of the dimension reduction engine 130 further infers relationship between entries of the metadata having the identified join columns by heuristics. Then the dimension reduction engine 130 terminates processing.

In cases where the Phase Two operations had not discovered any join columns, the dimension reduction engine 130 produces a null metadata model 190, indicating that the data sources 101 cannot be joined and dimensions of the data sources 101 cannot be semantically reduced. The metadata model 190 having join columns and inferred relationships is further utilized to process content of the data sources 101, for processing later intent phrases having similar semantics to the metadata model 190 with an improved efficiency. In searching the data sources 101 with future intent phrases, the search engine 170 can produce search results more efficiently by using the metadata model 190 that has reduced dimensions as the number of tables to be searched has been reduced by join columns that are semantically similar columns and relationships represented in the metadata model 190.

Figure 3:
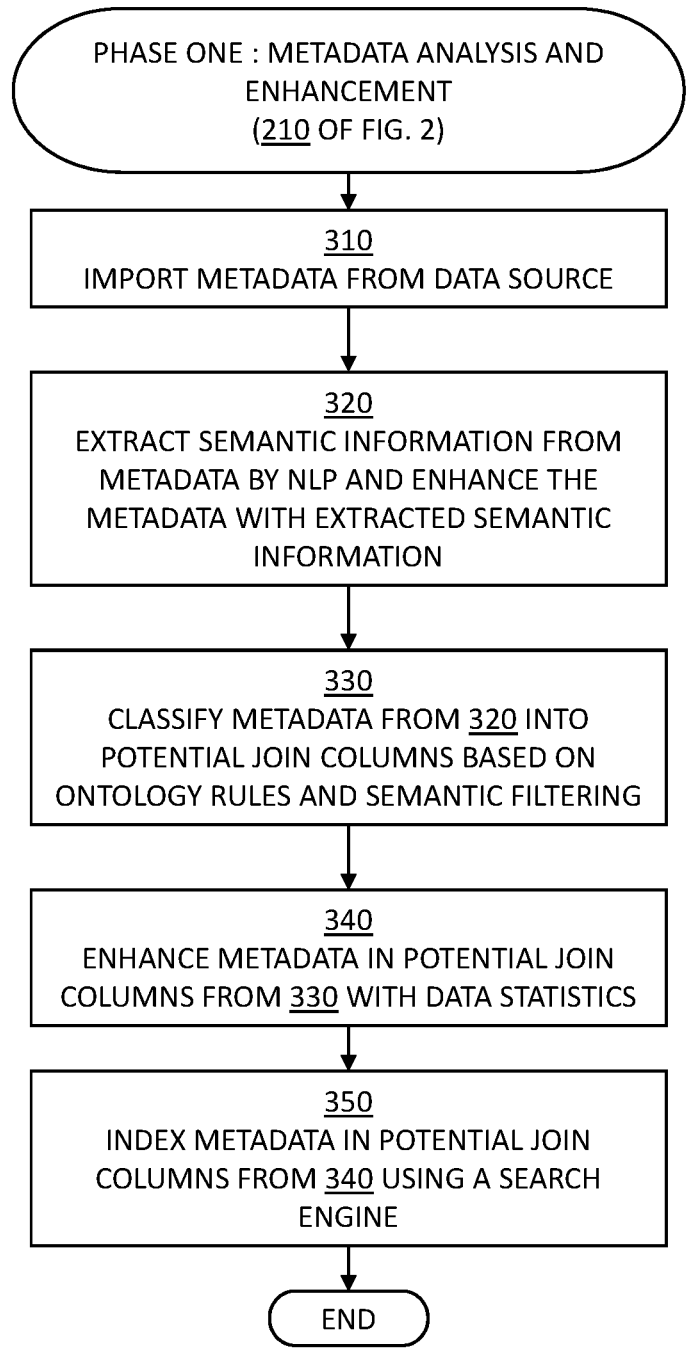
FIG. 3 depicts a flowchart for Phase One operations of the dimension reduction engine, as performing block 210 of FIG. 2, in accordance with one or more embodiments set forth herein.

FIG. 3 depicts a flowchart for Phase One operations of the dimension reduction engine 130, as performing block 210 of FIG. 2, in accordance with one or more embodiments set forth herein.

In block 310, the dimension reduction engine 130 imports the metadata 103 from each of the data source 101. Then, the dimension reduction engine 130 proceed with block 320.

The metadata 103 are data describing content data from each of the data source 101, including, paths to respective source data, organization of content data, column labels, data types, properties, keys, key types, a schema of database, data fields of each record of the source data 101. Each of the data source 101 is of types including, relational database, tables, spreadsheets, files, texts. The metadata 103 primarily include table names, field labels and data types for each field. In this specification, terms "record" and "row" are used interchangeably to indicate a record in the data source 101; terms "field", "label" and "column" are used interchangeably to indicate a property or an aspect of a record in the data source 101; and terms "table" and "database" are used interchangeably to indicate a series of records, respectively including a plurality of fields.

In this specification, a column includes a reference to a table or a data source 101, and the dimension reduction engine 130 identifies each column by use of a unique path information from the data source 101, a table to which the column belong, and the hierarchical schema information identifying where in the table the column is located and governing rules in operating the tables of a certain data source 101. For example, if a column indicates a data field from a data source 101 that is a spreadsheet, then the dimension reduction engine 130 identifies the column with an identifier for the spreadsheet, a sheet number, and a column number. For example, if a column is from a data source 101 that is a relational database, then the dimension reduction engine 130 identifies the column with an identifier for the relational database, a table name, and a column label.

In certain embodiments of the present invention, the dimension reduction engine 130 can optionally import content of the data source 101 in additional to the metadata 103 of the data source 101, for sampling and improving accuracy with the semantic annotation.

In block 320, the dimension reduction engine 130 extracts semantic information from the metadata 103 imported in block 310, by use of the natural language processing tools 180 and other data analysis tools. The semantic information extracted by the natural language processing tools 180 includes, for example, semantic and lexical annotation on the metadata 103. The dimension reduction engine 130 subsequently adds the semantic information as extracted to the metadata 103. Then, the dimension reduction engine 130 proceed with block 330.

The dimension reduction engine 130 annotates various semantic concepts to each column from the metadata 103, as more than one semantic concept can result from analyzing the metadata 103. According to the semantic analysis results provided by the natural language processing tools 180, the dimension reduction engine 130 associates a series of semantic concepts corresponding to each column from the metadata 103 by tagging with respective classifiers/tags. When more than one semantic concept is associated with a column, the concepts form a relationship. Semantic meaning of each column in the metadata 103 is represented by the concepts and relationships between the concepts in the result of block 320. Concepts of the columns in the metadata 103 are defined in the ontology rules 140. Based on association with multiple concepts for a specific column, the dimension reduction engine 130 infers a relationship between concepts associated with each column, semantic class, or entry of the metadata 103.

In certain embodiment of the present invention, the metadata 103 include a column labeled as "Product-ID" and a data type String. The dimension reduction engine 130 classifies the column "Product-ID" as two concepts of Identifier and Product. The two concepts of Identifier and Product are related as Product can have Identifier, in the ontology rules 140. Accordingly, the dimension reduction engine 130 annotates "Product-ID" with a semantic meaning of "IDENTIFIER OF PRODUCT."

Similarly, the dimension reduction engine 130 annotates a field name "EMPLOYEE_ID" with a semantic information "IDENTIFIER OF ENTITY", based on the natural language processing tools 180 that indicates semantic equivalence between "ID" and "IDENTIFIER", and the ontology rules 140 that specifies an employee as an entity.

For another example, a column labeled "Country" and data type String will be classified as "IDENTIFIER" and "COUNTRY", when data in the column are valid country names. The semantic meaning of the column "Country" would be "IDENTIFIER OF COUNTRY". If a certain unlabeled column have instances such as "Bob", "Sam", "Alice", then the unlabeled column would be semantically classified as "IDENTIFIER of ENTITY", according to the ontology rules 140 that specifies names as identifiers and that specifies human beings as entities.

For another example, a column labeled "Year" and data type Integer will be classified as IDENTIFIER and YEAR, when data in the column are within year range. The semantic meaning of the column would be "IDENTIFIER of YEAR".

A column labeled as "Cost" and a numeric data type will be classified as EXPENSE, according to the ontology rules 140 that specifies EXPENSE as a measure concept.

In block 330, the dimension reduction engine 130 classifies the metadata 103 from block 320 as semantically/lexically annotated approximately based on the ontology rules 140. Then, the dimension reduction engine 130 proceed with block 340.

In certain embodiments of the present invention, the dimension reduction engine 130 reduces the number of columns in the metadata 103 from block 320 by classifying the metadata 103 according to semantic information of the columns in the metadata 103, based on the ontology rules 140. The dimension reduction engine 130 classifies semantically similar columns from the metadata 103 into potential join columns. A certain number of semantic categories such as NAME OF EMPLOYEE, REVENUE, and IDENTIFIER OF PRODUCT, can be preconfigured for the potential join columns. The potential join columns identified by the dimension reduction engine 130 are likely to be an identifier for an entity column that represents more than one entities that share semantically compatible labels. For example, the dimension reduction engine 130 classifies column labels "Item No.", "Product ID", "Product serial", and any other column labels semantically indicating an identifier of a certain merchandise for sale as "Identifier of Product", according to the ontology rules 140.

In the same embodiment of the present invention, the ontology rules 140 for the potential join columns specify: that identifier labels can be joined together, but not with other kind of labels; that measurement labels can be joined together with other measurement labels; that both identifier columns and the measurement columns can be of a numeric data type, independent from the semantics of labels, and the data type does not affect identification of the potential join columns; that three (3) ontological categories are identifiers, measurements, and attributes, and attributes indicate the any kind of fields other than the identifiers and the measurements; that the identifier categories have subcategories of entities and objects, and an identifier of an entity and an identifier of an object are not compatible and not subject to form a join column.

In block 340, the dimension reduction engine 130 collects data statistics associated with respective potential join columns of the metadata 103 and enhances the potential join columns of the metadata 103 from block 330 with the collected data statistics. Then, the dimension reduction engine 130 proceed with block 350.

In certain embodiments of the present invention, the dimension reduction engine 130 collects a minimum data value, a maximum data value, and a distribution of data values for columns of a numeric data type for the potential join columns of the metadata 103. In certain embodiments of the present invention, the dimension reduction engine 130 collects timestamps describing a date and time of access for respective columns in the metadata 103 for the potential join columns of the metadata 103. The data statistics and the timestamps associated with the potential join columns provides additional aspects of the metadata 103 to improve efficiency of searches against the metadata 103 when requested information has any reference to the quantity, the distribution, and/or the time of a column to be discovered.

In block 350, the dimension reduction engine 130 automatically generating anticipated queries for the metadata 103 and indexes the metadata 103 in the potential joint columns from 340 by running the anticipated queries against the result from block 340, that is, the metadata 103 classified into the potential join columns, through the search engine 170. Indexes on the entries of the metadata 103 in the potential columns can improve efficiency with searches against the metadata 103, in the Phase Two operations when the user 105 demands information by querying the enhanced metadata 160 with the intent phrase 107. Then, the dimension reduction engine 130 proceed with block 220 of FIG. 2.

In certain embodiments of the present invention, the dimension reduction engine 130 generates the anticipated queries on the metadata 103 in the potential join columns based on subject domain of the respective data source 101, the imported metadata 103, the semantic information of the metadata 103, the ontology rules 140 that are applicable the metadata 103, the potential join columns identified for the metadata 103, and/or statistical information and timestamp information as collected for the metadata 103, and indexes entries of the metadata 103 according to respective keywords of the anticipated queries.

Figure 4:
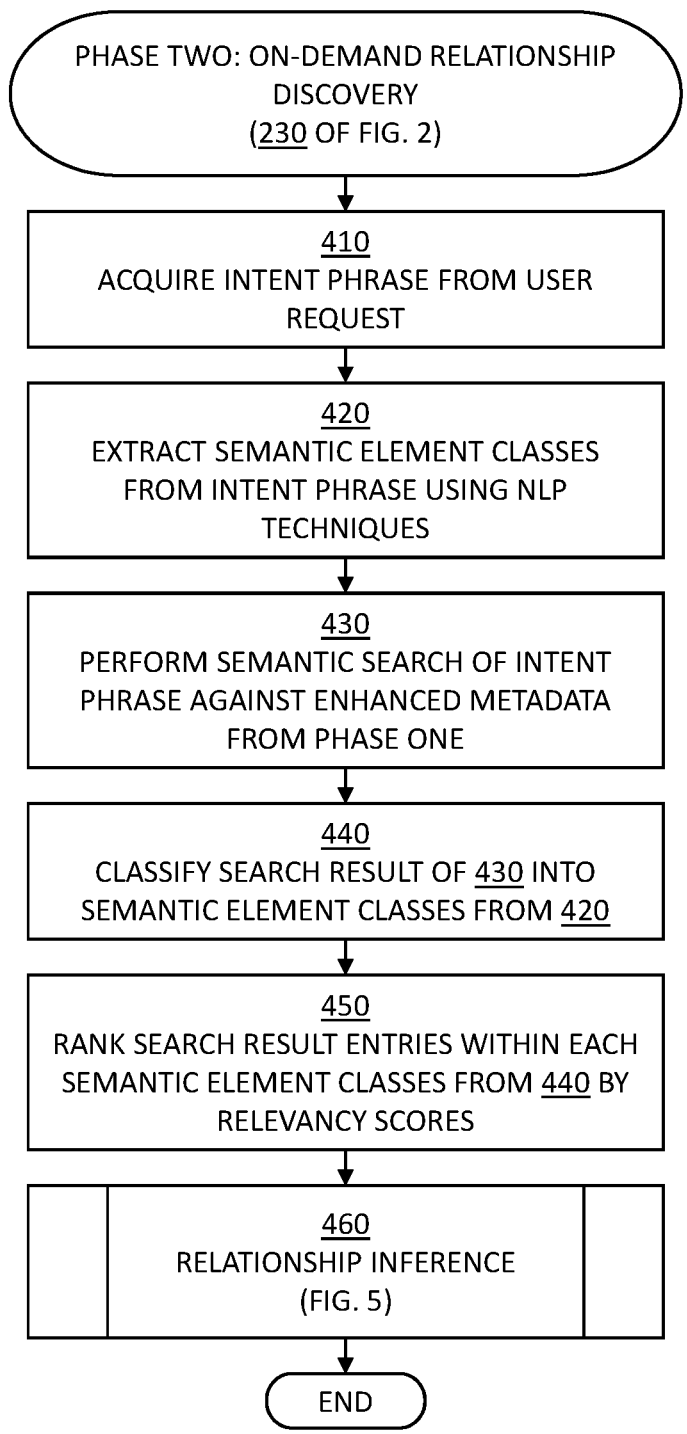
FIG. 4 depicts a flowchart for Phase Two operations of the dimension reduction engine, as performing block 230 of FIG. 2, in accordance with one or more embodiments set forth herein.

FIG. 4 depicts a flowchart for Phase Two operations of the dimension reduction engine 130, as performing block 230 of FIG. 2, in accordance with one or more embodiments set forth herein.

In block 410, the dimension reduction engine 130 obtains the intent phrase 107 from the user 105. The intent phrase 107 describes information the user 105 seeks from the source data 101, in natural language. For example, the intent phrase 107 for the data sources 101 in business analytics domain can be "revenue by location", "most popular product last year", or the like. Then, the dimension reduction engine 130 proceed with block 420.

In block 420, the dimension reduction engine 130 extracts a set of semantic element classes from the intent phrase 107 by use of the natural language processing tools 180. The set of semantic element classes from the intent phrase 107 can be preconfigured in the ontology rules 140 that is specific to the domain of application for the heuristic dimension reduction system 120 or a generic to the language being used. The ontology rules 140 representing a generic linguistic ontology can be usable when the domain of application employs common terms of the language being used, as in the business analytics application examples from FIG. 3. On the other hand, a certain domain of application based on a particular nomenclature and meanings distinctive from common terms of the language, the ontology rules 140 are often specific to the domain of application, in order to analyze concepts represented in the intent phrase 107 more accurately with the natural language processing tools 180. Then, the dimension reduction engine 130 proceed with block 430.

In certain embodiments of the present invention, the dimension reduction engine 130 extracts two (2) semantic classes of Money and Country from an intent phrase 107 "revenue by country".

In block 430, the dimension reduction engine 130 forms a semantic search query based on the semantics of the intent phrase 107, and performs a semantic search against the enhanced metadata 150 resulting from the Phase One of dimension reduction engine 130. The semantic search query represents a set of concepts of the intent phrase 107, which is equivalent to the semantic element classes as extracted from block 420. The dimension reduction engine 130 runs the semantic search query against the enhanced metadata 150 as classified in the potential join columns, and, as a result, obtains a search result including zero or more column that matches at least one concept of the intent phrase 107 and tables/files to which the semantically matching columns belong. As the columns of the enhanced metadata 150 classified in the potential join columns are prepared with respective semantic information, data statistics when applicable, and the search indices, the dimension reduction engine 130 can semantically match the set of concepts in the intent phrase 107 with the column labels of the enhanced metadata 150, semantic information respective to the column labels, data statistics respective to applicable columns, or a search index for each column. Then, the dimension reduction engine 130 proceed with block 440.

In certain embodiments of the present invention, the dimension reduction engine 130 can direct the search engine 170 to first match the set of concepts in the intent phrase 107 with the tags/classifiers of the potential join columns of the enhanced metadata 150, and then subsequently search the columns and appended information elements only within the potential join columns that matches at least one of the concepts in the intent phrase 107.

In certain embodiments of the present invention, the dimension reduction engine 130 further configures the semantic search as performed by the search engine 170 by use of a predefined synonyms. For example, based on the intent phrase 107 "regional sales last year", the dimension reduction engine 130 searches the enhanced metadata 150 for "sales", "revenue", and "earning", when the terms "revenue" and "earning" is predefined as synonyms for "sales".

In block 440, the dimension reduction engine 130 classifies the search results from block 430 into the semantic element classes from the intent phrase 107, as extracted in block 420. As noted in block 430, the search results include columns from the enhanced metadata 107 matching the concepts of the intent phrase 107, as each column being identified by a full path information identifying a data source 101, a file, a database table, or any other data structure from which the column originates. Then, the dimension reduction engine 130 proceed with block 450.

In block 450, the dimension reduction engine 130 ranks the search results within respective semantic element classes, as resulting from block 440, based on relevancy scores of each table in the search results. The dimension reduction engine 130 can optionally reorder tables in the semantic element classes according to respective relevancy score ranks corresponding to the tables, to efficiently access the tables in the semantic element classes in the order of the relevancy score ranks. Then, the dimension reduction engine 130 proceed with block 460.

In certain embodiments of the present invention, the dimension reduction engine 130 utilizes a point system for accounting the relevancy score for each table in the search results, which assesses predefined respective points for every appearance and/or inclusion of each semantic element corresponding to each semantic element class in table names and column labels in the respective tables, and aggregates all points assessed for a table entry in the search results, as placed in the respective semantic element classes.

In block 460, the dimension reduction engine 130 automatically, and by use of heuristic rules on the semantic elements of the intent phrase 107, infers a join relationship amongst entries in the search result. The search result entries from the enhanced metadata 150 is classified according to the semantic elements classes appearing in the intent phrase 107, and the search result entries are ranked according to relevancy scores for respective semantic element classes, as resulting from block 450. Detailed operations in the relationship inference of block 460 are presented in FIG. 5 and corresponding description. Then, the dimension reduction engine 130 proceed with block 240 of FIG. 2.

Figure 5:
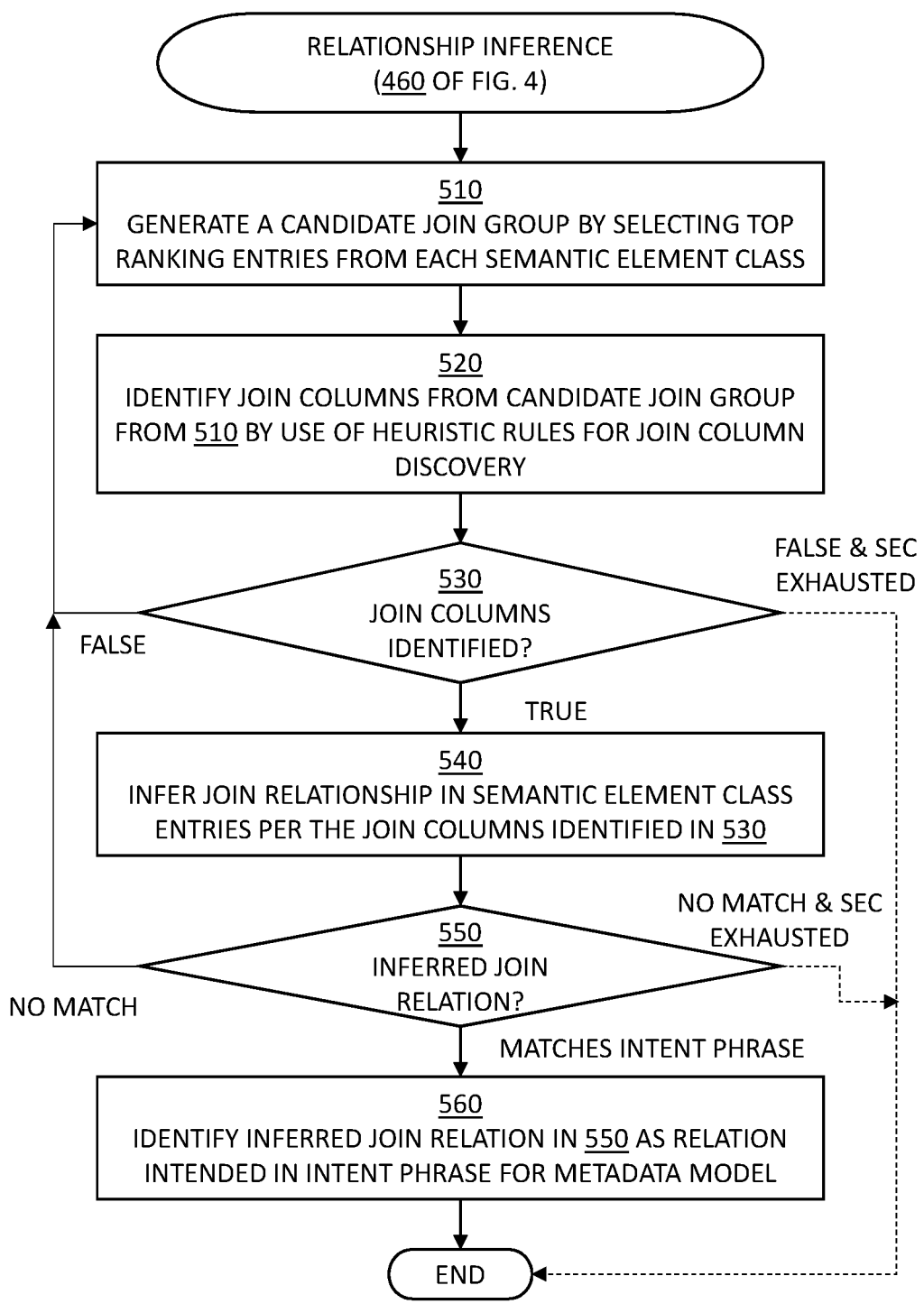
FIG. 5 depicts a flowchart for inferring relationship of Phase Two operations of the dimension reduction engine, as performing block 460 of FIG. 4, in accordance with one or more embodiments set forth herein.

FIG. 5 depicts a flowchart for inferring relationship of Phase Two operations of the dimension reduction engine 130, as performing block 460 of FIG. 4, in accordance with one or more embodiments set forth herein.

In block 510, the dimension reduction engine 130 generate a candidate join group by selecting a top ranking entry from each semantic element class resulting from block 450 of FIG. 4. As noted, entries associated with respective relevancy scores in the semantic element classes are tables and/or files from the enhanced metadata 150. Then, the dimension reduction engine 130 proceed with block 520.

If the dimension reduction engine 130 performs block 510 in iteration after block 530 or block 550, then the dimension reduction engine 130 selects a next ranked entry in each semantic element class to form a new candidate join group. The entries in the new candidate join group have respectively equal or less relevancy scores than the entries of the previous run of block 510, but the dimension reduction engine 130 examines for a join column and a join relationship as the top-ranked entries in the semantic element class either does not have the join column or the join relationship does not match the intent phrase 107.

In block 520, the dimension reduction engine 130 identifies join columns, indicating a unique pair of entries in the candidate join group from block 510, by use of a join column discovery rules of the dimension reduction engine 130. The join columns are respectively from two tables/files that have, respectively, the highest relevancy scores in the respective semantic element classes that have respective columns/labels, by which the pair of entries, often database tables, from the respective semantic classes can be joined together. Then, the dimension reduction engine 130 proceed with block 530.

In certain embodiments of the present invention, the heuristic rules are configured to represent characteristics of JOIN operations available in subject database system of the data sources 101.

In certain embodiments of the present invention, the dimension reduction engine 130 employs a binary comparison method, in which computing semantic similarities of two tables from the candidate join group of block 510 at a time, and determines whether or not the two tables as being compared can be joined by a join column present in both tables according to diagnostic scoring approach based on a set of heuristic rules.

In the same embodiment of the present invention, the dimension reduction engine 130 selects the two tables from the candidate join group of block 510, when the two tables are semantically distinctive enough, such that joining the two tables would actually reduce dimension of the metadata model 190 that is utilized in searching the data sources 101. The dimension reduction engine 130 is configured to select semantically distinctive tables by selecting tables from different semantic element classes in block 510. As noted, semantically similar tables are classified together into the same semantic element class.

In the same embodiment of the present invention, the dimension reduction engine 130 employs the set of heuristic rules for identifying a join column in two semantically distinctive tables, by use of diagnostic scoring approach. The heuristic rules are defined as a set of conditions that are heuristically established for being positively or negatively indicative of the join column and each condition is assigned with respective diagnostic score. The dimension reduction engine 130 checks the two tables and respective columns for each condition in the heuristic rules, while aggregating diagnostic scores accounted for each condition.

In the same embodiment of the present invention, the dimension reduction engine 130 selects two columns respectively from the two tables in the candidate join group from block 510 according to the heuristic rules. The dimension reduction engine 130 assesses the diagnostic score as configured in the heuristic rule as applying the heuristic rules to the columns of the two tables in the candidate join group.

In the same embodiment of the present invention, the heuristic rules are to identify semantically similar columns, referred to as the join columns, from each of the two tables, by which the two tables can be joined. In the same embodiment, the heuristic rules specifies: that an increase in the diagnostic score by a preconfigured point for a combination of two columns if the two columns have matching or synonymous labels; that an increase in the diagnostic score by a preconfigured point for a combination of two columns if the two columns share a semantic entity category; and that an increase in the diagnostic score by a preconfigured point for a combination of two columns if the two columns share a semantic attribute.

In the same embodiment, the heuristic rules also specifies that any column name with semantic meaning of "Identifier of Row" would not be a join column, as every table has a column to identify a row/record in the table. The heuristic rules further specifies that the columns of the same semantic attribute are to overlap in the respective range of data values, according to MIN/MAX in data statistics available for certain data types from the enhanced metadata 150, in order to increase the diagnostic score for a combination of two columns by a preconfigured point. The heuristic rules further specifies that the columns related in a many-to-many data relationship cannot be the join columns, as in data statistics columns indicating how many distinctive data values are present in a certain table, because the data statistics columns represents information internal to one of the table but not applicable for both tables from the candidate join group.

Examples of matching or synonymous labels include, but are not limited to, labels Product-ID and Product ID, labels SalesCountryCode and CountryCode. Examples of the same semantic entity categories include, but are not limited to, entities Employee and Personnel, entities Product and Item. Examples of the same semantic attribute include, but are not limited to, attributes ID and Identifier, attributes Serial Number and Item No.

As noted in the ontology rules 140 for the metadata 103, a column is first classified into Entity or Measurement/Measure. Examples of Measurement column include "Sales", "Salary", "Revenue", and "Expense amount". If a numeric quantity is an Entity column, rather than a Measurement, then, the dimension reduction engine 130 classifies the Entity column with a category concept and an attribute concept. Accordingly, the Entity column is classified as an Attribute of Entity, which is a subcategory of Entity column. A single entity could have many attributes. For example, for an Entity corresponding to a Person, Attributes of the Person can include First Name, Last Name, Age, Phone Number, Address, and many other attributes. For a column to have a clear association with a concept, each semantic entity category of the column is specified with respective attributes. Accordingly, the dimension reduction engine 130 identifies attributes associated with respective entity columns to specify which entity the column represents. For example, a table representing employees have many column respective to attributes of each employee, such as Employee ID and all attributes applicable for a person, as shown above.

In certain embodiments of the present invention, the dimension reduction engine 130 identifies the join column from two different tables according to the heuristic rules based on the attributes and categories of each column. In the same embodiment of the present invention, the dimension reduction engine 130 individually scores the columns for the same semantic entity category and for the same semantic attribute, and the heuristic rule can be configured to have a threshold for a sum of all diagnostic scores high enough that the dimension reduction engine 130 would identify the join column when both the semantic entity category and the semantic attribute match in the two tables.

In certain embodiments of the present invention, the heuristic rules are configured to increase the diagnostic score by one (1) point for the join columns when each condition specified in the heuristic rule is satisfied. In other embodiments of the present invention, the heuristic rules are configured to increase distinctive points for respective conditions specified in the heuristic rules. In certain embodiments of the present invention, the heuristic rules are configured to set the diagnostic score for the join columns as a negative value and terminate processing the combination of the two columns, when a restrictive conditions are satisfied in order to mark the two columns currently being examined are not join columns.

In the same embodiment of the present invention as the heuristic rules increase one point for each satisfied condition and assigns a negative diagnostic score for any combination of columns that does not qualify as join columns, the dimension reduction engine 130 has a certain number of combinations of respective two columns, respectively corresponding to an aggregated diagnostic score for a combination of two columns. In the same embodiment of the present invention, the dimension reduction engine 130 is configured with a threshold for the diagnostic score for a combination of two columns can be join columns by which two tables originating the two columns to be joined.

For example, at the conclusion of block 520, the dimension reduction engine 130 has a combination of two columns and a diagnostic score "3" corresponding to the combination (C2TA-C3TB: 3), where C2TA indicates a second column of Table A, and C3TB indicates a third column of Table B.

In block 530, the dimension reduction engine 130 determines if join columns are identified, by examining any combination of two columns has a diagnostic score greater than or equal to the threshold to be join columns, as assessed from block 520. If the dimension reduction engine 130 determines that join columns are identified, then the dimension reduction engine 130 proceeds with block 540. If the dimension reduction engine 130 determines that no join columns are identified, then the dimension reduction engine 130 further determines if all entries of the semantic element classes had been examined. If the dimension reduction engine 130 determines that no join columns had been identified and that unexamined entries from the semantic element classes are left, indicating that a new candidate join group can be generated in block 510 for identifying join columns, then the dimension reduction engine 130 loops back to block 510. If the dimension reduction engine 130 determines that no join columns had been identified and that all entries from the semantic element classes had been examined, indicating that the semantic element classes do not have any join columns, then the dimension reduction engine 130 terminates processing block 460 of FIG. 4 and proceeds with block 240 of FIG. 2.

In block 540, the dimension reduction engine 130 infers a join relationship between the two entries in the semantic element classes, from which the join columns identified in block 530 as marking the diagnostic score greater than or equal to the threshold for identifying the join columns. The dimension reduction engine 130 utilizes statistical information from past join columns and join relationships to ensure cardinality between the two entries. As noted, the entries are tables or files in which the join column is a part of, and the join relationship between two tables pivots according to the semantics of the join columns. For example, the join column Year is identified from both Table Yearly Revenue and Table Sales by Countries, then the join relationship between the two tables of Yearly Revenue by Countries can be inferred. Then, the dimension reduction engine 130 proceed with block 550.

In block 550, the dimension reduction engine 130 determines whether or not the join relationship as inferred from block 540 conduce to the metadata model 190 that satisfies the intent phrase 107 obtained from the user 105 in block 410. The dimension reduction engine 130 determines that the join relationship satisfies the intent phrase 107, if the join relationship represents all semantic element classes extracted from the intent phrase 107, that is includes tables from respective semantic element classes of the intent phrase 107. If the dimension reduction engine 130 determines that the join relationship satisfies the intent phrase 107, then the dimension reduction engine 130 proceeds with block 560. If the dimension reduction engine 130 determines that the join relationship does not satisfy the intent phrase 107, then the dimension reduction engine 130 further determines if all entries of the semantic element classes had been examined.

If the dimension reduction engine 130 determines that the join relationship does not conduce the metadata model 190 that satisfy the intent phrase 107 and that unexamined entries from the semantic element classes are left, indicating that a new candidate join group can be generated in block 510 for identifying a new join column, then the dimension reduction engine 130 loops back to block 510. If the dimension reduction engine 130 determines that the join relationship does not conduce the metadata model 190 that satisfy the intent phrase 107 and that all entries from the semantic element classes had been examined without a join relationship representing all semantic element classes, then the dimension reduction engine 130 terminates processing block 460 of FIG. 4 and proceeds with block 240 of FIG. 2.

In block 560, the dimension reduction engine 130 identifies the join relation from block 550 that represents all semantic element classes from the intent phrase 107 for the metadata model 190. Then, the dimension reduction engine 130 proceed with block 240 of FIG. 2.

Figure 6:
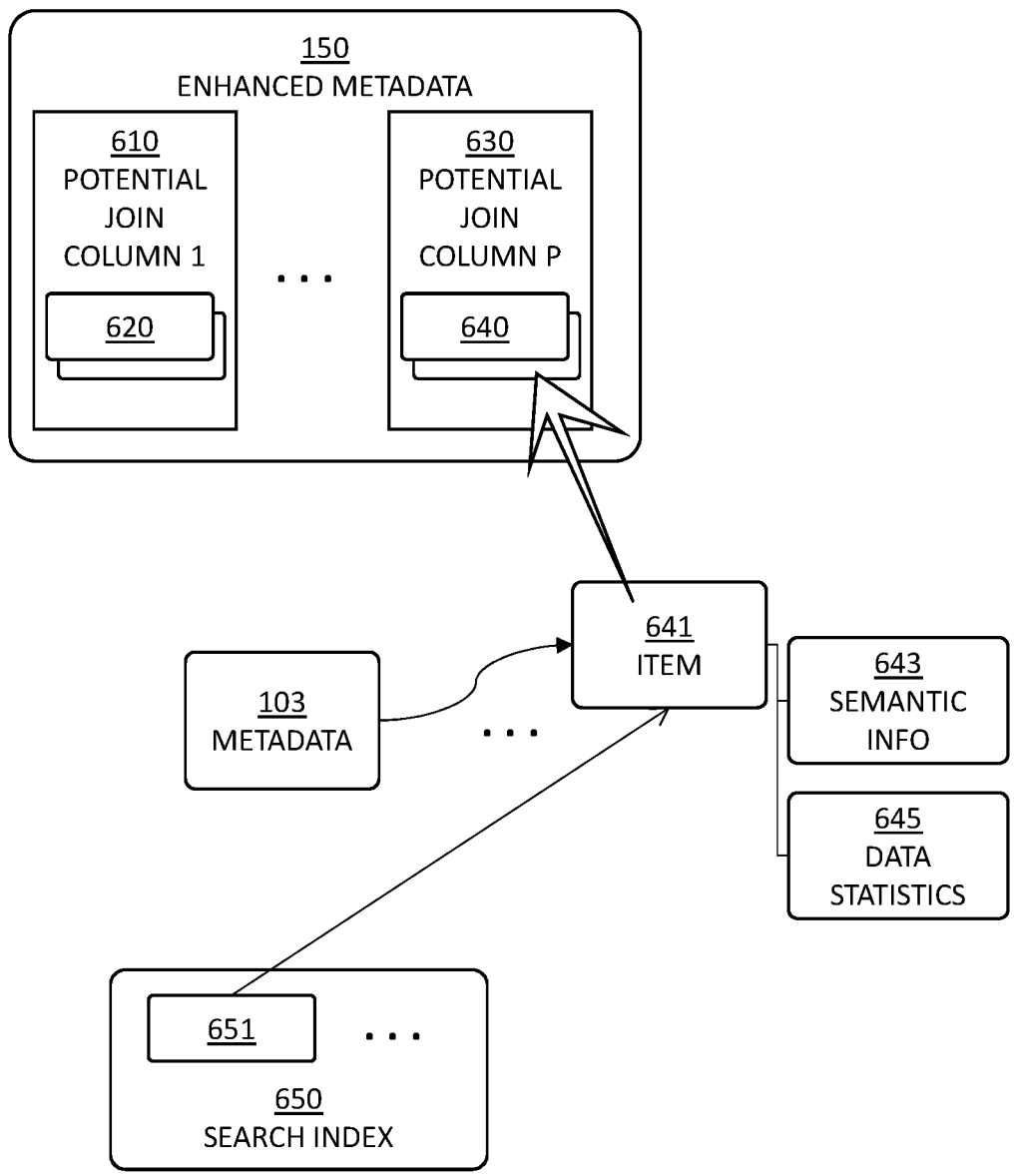
FIG. 6 depicts an exemplary components of the enhanced metadata, resulting from Phase One operations of the dimension reduction engine, in accordance with one or more embodiments set forth herein.

FIG. 6 depicts an exemplary components of the enhanced metadata 150, resulting from Phase One operations of the dimension reduction engine 130, in accordance with one or more embodiments set forth herein.

In Phase One operations of the dimension reduction engine 130, the dimension reduction engine 130 obtains the metadata 103. Respective metadata items 620, 640 in the metadata 103 are analyzed and semantic information for each metadata item 620, 640 is extracted and attached to the respective metadata items 620, 640 in block 320 of FIG. 3. All metadata items 620, 640 are classified based on the ontology rules 140 and put into one of potential join columns 610, 630 that represents each metadata item the best, in block 330 of FIG. 3. One instance of metadata item 641 and an instance of semantic information 643 is shown. Data statistics 645 for the metadata item 641 is collected and attached to the metadata item 641 in block 340 of FIG. 3. A search index 650 with an entry 651 for each metadata item in all metadata items 641 of the enhanced metadata 150 is created in the search engine 170 in block 350 of FIG. 3. The enhanced metadata 150 results from Phase One operations of the dimension reduction engine 130, as the metadata 103 is prepared for on demand relationship inference based on the intent phrase 107 in Phase Two operations.

Figure 7:
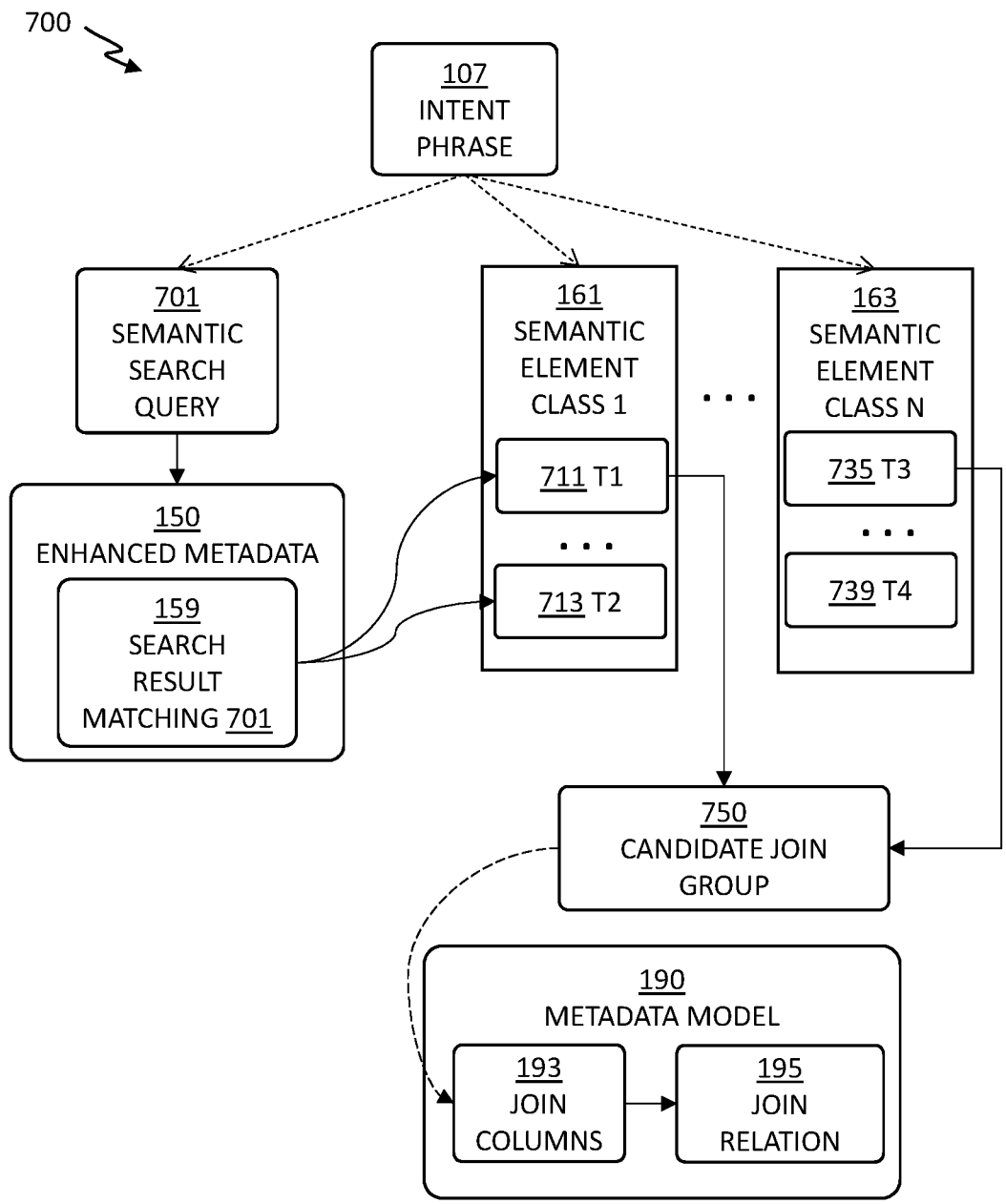
FIG. 7 depicts data components during operations of the Phase Two of the dimension reduction engine, in accordance with one or more embodiments set forth herein.

FIG. 7 depicts data components during operations of the Phase Two of the dimension reduction engine 130, in accordance with one or more embodiments set forth herein.

The dimension reduction engine 130 obtains the intent phrase 107 in block 410 of FIG. 4. Semantic element classes 161, 163 are extracted in block 420 of FIG. 4. The dimension reduction engine 130 creates a semantic search query 701 from the intent phrase 107 and the enhanced metadata 150 searched with the semantic search query 701 in block 430 of FIG. 4. The search result 159 against the enhanced metadata 150 includes columns and tables in the metadata that are semantically similar to the intent phrase 107. The search result 159 are classified into the semantic element classes 161, 163, and placed as entries 711, 713, 735, 739 of respective semantic element classes 161, 163 in block 440 of FIG. 4. The search result entries 711, 713, 735, 739 are ranked and/or reordered based on respective relevancy scores for each semantic element classes in block 450 of FIG. 4.

In block 510 of FIG. 5, the dimension reduction engine 130 generates a candidate join group 750, from the highest ranked entries 711, 735 from respective semantic element classes 161, 163. Join columns 193 are identified in block 530, and a join relation 195 is inferred between the entries from which the join columns 193 had been identified. The metadata model 190 including the join columns 193 and the join relation 195 is produced.

Certain embodiments of the present invention automatically reduces dimensionality of a large source dataset by use of ontology rules, semantic relevancy from natural language processing, heuristic rules on referential cardinality of datasets. Certain embodiments of the present invention achieves automated dimension reduction by relationship inference in real time on-demand. Certain embodiments of the present invention improves efficiency in obtaining search result requested by intent phrases by automating the relationship inference that is often handled interactively by user inputs in conventional applications. Certain embodiments of the present invention provides the search results in real time that is not available with the conventional dimension reduction processes that requires user input. Certain embodiments of the present invention improves performance in conventional dimension reduction techniques where extensive computation is required without user input, by use of heuristic rules and diagnostic scoring on referential cardinality to identify join columns from two semantically distinctive dataset entries. Certain embodiments of the present invention reduces computational requirement by semantically classifying both metadata of the data sources and the intent phrases demanding a specific result from the data sources. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The heuristic dimension reduction system can efficiently upkeep with rapidly increasing source data, by preparing the metadata of the source data as semantically classified for on demand search result in real time, and can be offered as an independent service for distinctive processes for dimension reduction.

Figure 8:
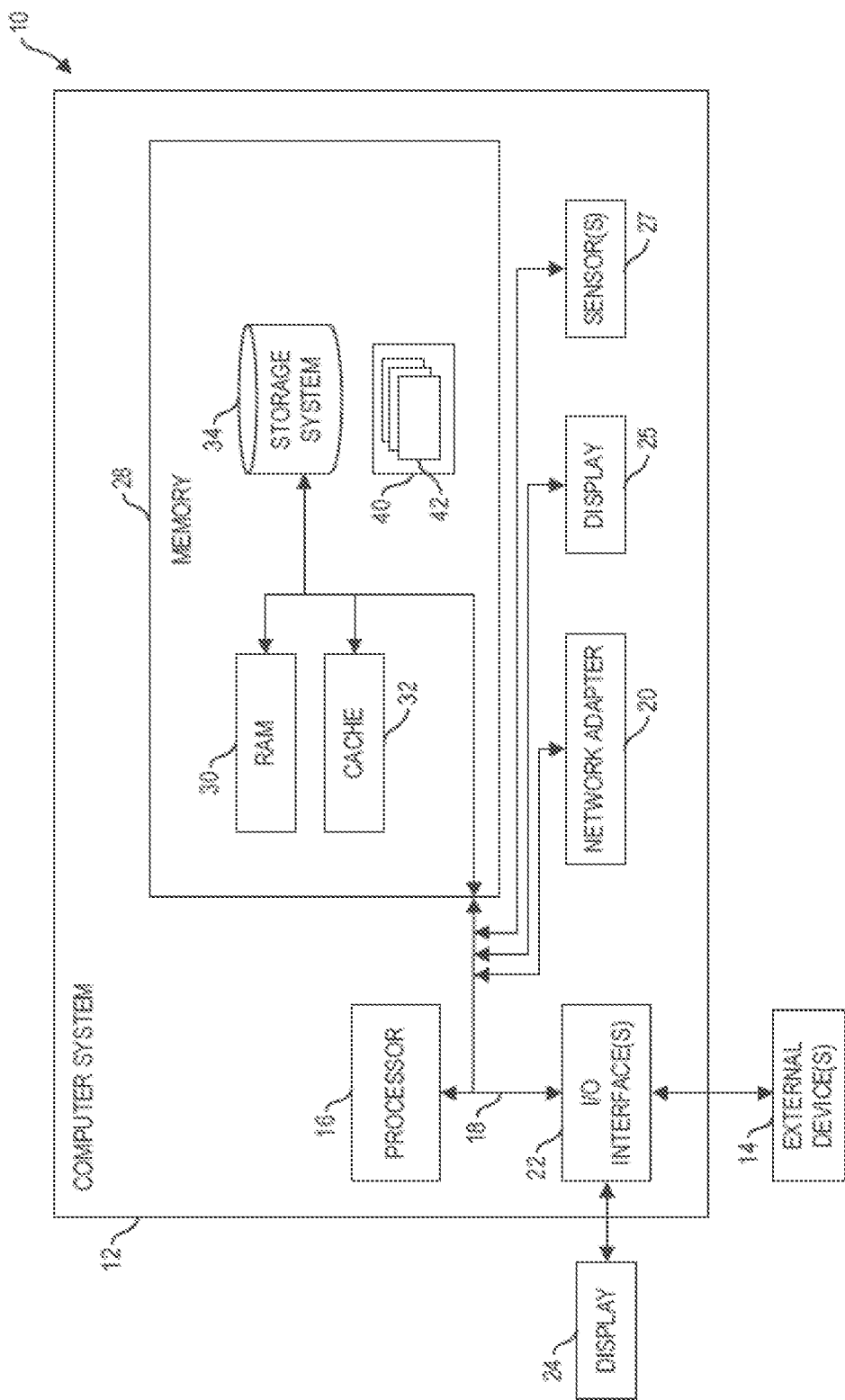
FIG. 8 depicts a cloud computing node according to an embodiment of the present invention.
Figure 9:
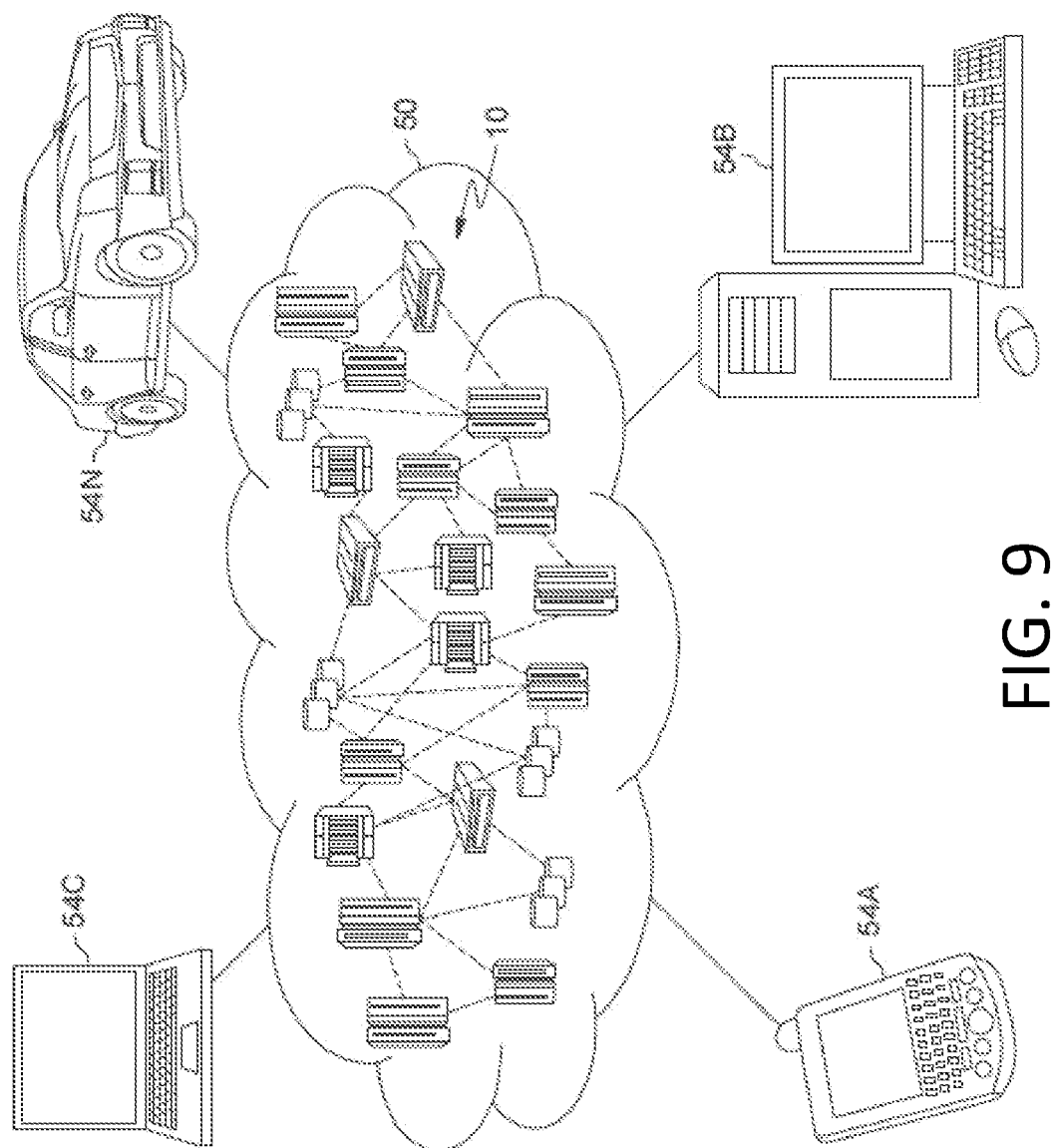
FIG. 9 depicts a cloud computing environment according to an embodiment of the present invention.
Figure 10:
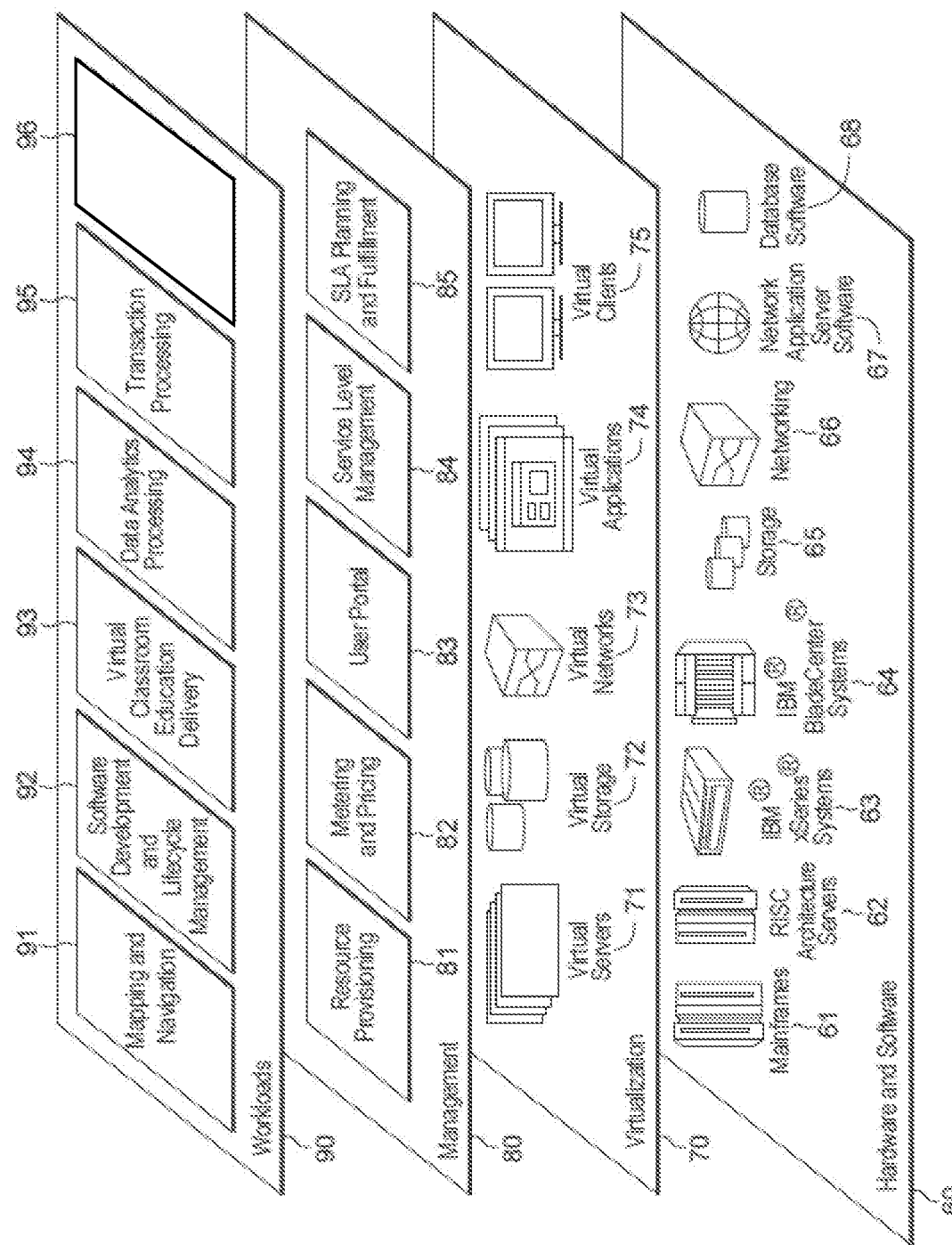
FIG. 10 depicts abstraction model layers according to an embodiment of the present invention.

FIGS. 8-10 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the dimension reduction engine 130 and the heuristic dimension reduction system 120 of FIG. 1, respectively. Program processes 42, as in the dimension reduction engine 130, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 9, illustrative cloud computing environment 50 is depicted. As shown, cloud computing environment 50 includes one or more cloud computing nodes 10 of FIG. 8 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the heuristic dimension reduction system 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   obtaining, by one or more processor, metadata on respective datasets from a plurality of data sources;
   preparing, by the one or more processor, an enhanced metadata based on the metadata from the obtaining, wherein an item of the metadata is associated with semantic information for the item, available data statistics on the item, and a search index for the item, and wherein the enhanced metadata has all items of the metadata semantically classified into respective potential join columns;
   receiving, by the one or more processor, an intent phrase for search on the datasets from the plurality of data sources; and
   producing, by the one or more processor, a metadata model that satisfies the intent phrase, the metadata model including a plurality of join columns and a plurality of join relationships, wherein a join column of the metadata model indicates a column common in two entries from the enhanced metadata, wherein a join relationship of the metadata model is inferred as a relationship between two entries of the enhanced metadata that commonly have the join column, and wherein the two entries are classified into respective semantic element classes extracted from the intent phrase.

2. The computer implemented method of claim 1, the preparing comprising:
   extracting respective semantic information from items of the metadata by use of natural language processing tools;
   associating each semantic information from extracting to respective items of the metadata that corresponds to the semantic information;
   classifying the items of the metadata into the respective potential join columns based on ontology rules;
   collecting data statistics on measurement items of the metadata and subsequently associating each data statistics to a measurement item corresponding to respective data statistics; and creating search indices for the items of the metadata and subsequently associating a search index with each item of the metadata semantically relevant to the search index.

3. The computer implemented method of claim 2, wherein the ontology rules for the potential join columns specify that three (3) ontological categories are identifiers, measurements, and attributes, that identifier labels can be joined with other identifier labels, that measurement labels can be joined with other measurement labels; that both identifier columns and the measurement columns can be of a numeric data type, independent from semantics of respective labels, and that data types of the respective labels do not affect identifying the potential join columns.

4. The computer implemented method of claim 1, the producing comprising:
extracting semantic element classes from the intent phrase by use of natural language processing tools;
generating a semantic search query from the intent phrase;
locating a search result by searching entries in the enhanced metadata with the semantic search query;
classifying entries of the search result into the semantic element classes based on semantic similarity of the entries to each semantic element represented by the respective semantic element classes;
ranking the entries of the search result within each semantic element class based on a relevancy score of each entry indicating the level of relevancy of a subject entry to a semantic element represented by a semantic element class to which the subject entry belongs; and
building the metadata model based on a collection of highest ranking entries from all semantic element classes.

5. The computer implemented method of claim 4, the building comprising:
generating a candidate join group of highest ranking entries from all semantic element classes;
identifying the join column from the candidate join group by diagnostic scoring, wherein the join column is a column common to the two entries in the candidate join group; and
inferring the join relationship between the two entries of the two entries associated by the join column from the identifying.

6. The computer implemented method of claim 5, wherein heuristic rules for diagnostic scoring for identifying the join column specifies to increase a diagnostic score by a preconfigured point for a combination of two columns if the two columns have matching or synonymous labels, in respective entries in the semantic element classes, if the two columns are of a semantic entity category, or if the two columns share a semantic attribute.

7. The computer implemented method of claim 1, wherein the metadata model is utilized in later searches of the datasets from the plurality of data sources if another intent phrase is semantically compatible to the intent phrase as having the same semantic element classes as the intent phrase.

8. A computer program product comprising:
a computer readable storage medium readable by one or more processor and storing instructions for execution by the one or more processor for performing a method comprising:
obtaining metadata on respective datasets from a plurality of data sources;
preparing an enhanced metadata based on the metadata from the obtaining, wherein an item of the metadata is associated with semantic information for the item, available data statistics on the item, and a search index for the item, and wherein the enhanced metadata has all items of the metadata semantically classified into respective potential join columns;
receiving an intent phrase for search on the datasets from the plurality of data sources; and
producing a metadata model that satisfies the intent phrase, the metadata model including a plurality of join columns and a plurality of join relationships, wherein a join column of the metadata model indicates a column common in two entries from the enhanced metadata, wherein a join relationship of the metadata model is inferred as a relationship between two entries of the enhanced metadata that commonly have the join column, and wherein the two entries are classified into respective semantic element classes extracted from the intent phrase.

9. The computer program product of claim 8, the preparing comprising:
extracting respective semantic information from items of the metadata by use of natural language processing tools;
associating each semantic information from extracting to respective items of the metadata that corresponds to the semantic information;
classifying the items of the metadata into the respective potential join columns based on ontology rules;
collecting data statistics on measurement items of the metadata and subsequently associating each data statistics to a measurement item corresponding to respective data statistics; and
creating search indices for the items of the metadata and subsequently associating a search index with each item of the metadata semantically relevant to the search index.

10. The computer program product of claim 9, wherein the ontology rules for the potential join columns specify that three (3) ontological categories are identifiers, measurements, and attributes, that identifier labels can be joined with other identifier labels, that measurement labels can be joined with other measurement labels; that both identifier columns and the measurement columns can be of a numeric data type, independent from semantics of respective labels, and that data types of the respective labels do not affect identifying the potential join columns.

11. The computer program product of claim 8, the producing comprising:
extracting semantic element classes from the intent phrase by use of natural language processing tools;
generating a semantic search query from the intent phrase;
locating a search result by searching entries in the enhanced metadata with the semantic search query;
classifying entries of the search result into the semantic element classes based on semantic similarity of the entries to each semantic element represented by the respective semantic element classes;
ranking the entries of the search result within each semantic element class based on a relevancy score of each entry indicating the level of relevancy of a subject entry to a semantic element represented by a semantic element class to which the subject entry belongs; and
building the metadata model based on a collection of highest ranking entries from all semantic element classes.

12. The computer program product of claim 11, the building comprising:

generating a candidate join group of highest ranking entries from all semantic element classes;

identifying the join column from the candidate join group by diagnostic scoring, wherein the join column is a column common to the two entries in the candidate join group; and inferring the join relationship between the two entries of the two entries associated by the join column from the identifying.

13. The computer program product of claim 12, wherein heuristic rules for diagnostic scoring for identifying the join column specifies to increase a diagnostic score by a preconfigured point for a combination of two columns if the two columns have matching or synonymous labels, in respective entries in the semantic element classes, if the two columns are of a semantic entity category, or if the two columns share a semantic attribute.

14. The computer program product of claim 8, wherein the metadata model is utilized in later searches of the datasets from the plurality of data sources if another intent phrase is semantically compatible to the intent phrase as having the same semantic element classes as the intent phrase.

15. A system comprising:
a memory;
one or more processor in communication with memory; and
program instructions executable by the one or more processor via the memory to perform a method comprising:
obtaining metadata on respective datasets from a plurality of data sources;
preparing an enhanced metadata based on the metadata from the obtaining, wherein an item of the metadata is associated with semantic information for the item, available data statistics on the item, and a search index for the item, and wherein the enhanced metadata has all items of the metadata semantically classified into respective potential join columns;
receiving an intent phrase for search on the datasets from the plurality of data sources; and
producing a metadata model that satisfies the intent phrase, the metadata model including a plurality of join columns and a plurality of join relationships, wherein a join column of the metadata model indicates a column common in two entries from the enhanced metadata, wherein a join relationship of the metadata model is inferred as a relationship between two entries of the enhanced metadata that commonly have the join column, and wherein the two entries are classified into respective semantic element classes extracted from the intent phrase.

16. The system of claim 15, the preparing comprising:
extracting respective semantic information from items of the metadata by use of natural language processing tools;
associating each semantic information from extracting to respective items of the metadata that corresponds to the semantic information;
classifying the items of the metadata into the respective potential join columns based on ontology rules;
collecting data statistics on measurement items of the metadata and subsequently associating each data statistics to a measurement item corresponding to respective data statistics; and
creating search indices for the items of the metadata and subsequently associating a search index with each item of the metadata semantically relevant to the search index.

17. The system of claim 16, wherein the ontology rules for the potential join columns specify that three (3) ontological categories are identifiers, measurements, and attributes, that identifier labels can be joined with other identifier labels, that measurement labels can be joined with other measurement labels; that both identifier columns and the measurement columns can be of a numeric data type, independent from semantics of respective labels, and that data types of the respective labels do not affect identifying the potential join columns.

18. The system of claim 15, the producing comprising:
extracting semantic element classes from the intent phrase by use of natural language processing tools;
generating a semantic search query from the intent phrase;
locating a search result by searching entries in the enhanced metadata with the semantic search query;
classifying entries of the search result into the semantic element classes based on semantic similarity of the entries to each semantic element represented by the respective semantic element classes;
ranking the entries of the search result within each semantic element class based on a relevancy score of each entry indicating the level of relevancy of a subject entry to a semantic element represented by a semantic element class to which the subject entry belongs; and
building the metadata model based on a collection of highest ranking entries from all semantic element classes.

19. The system of claim 18, the building comprising:
generating a candidate join group of highest ranking entries from all semantic element classes;
identifying the join column from the candidate join group by diagnostic scoring, wherein the join column is a column common to the two entries in the candidate join group; and
inferring the join relationship between the two entries of the two entries associated by the join column from the identifying.

20. The system of claim 19, wherein heuristic rules for diagnostic scoring for identifying the join column specifies to increase a diagnostic score by a preconfigured point for a combination of two columns if the two columns have matching or synonymous labels, in respective entries in the semantic element classes, if the two columns are of a semantic entity category, or if the two columns share a semantic attribute.

\* \* \* \* \*